UNITED STATES PATENT OFFICE 2,500,607

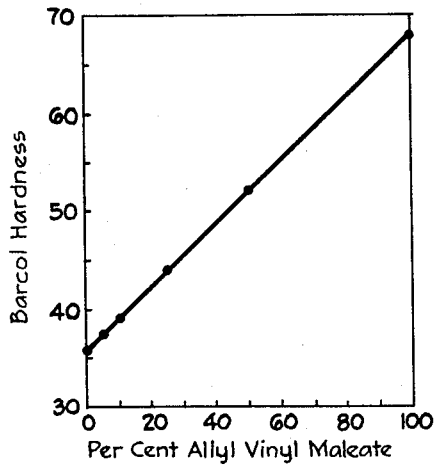
FIG. 1 Copolymer of Allyl Vinyl Maleate and Diallyl Phthalate
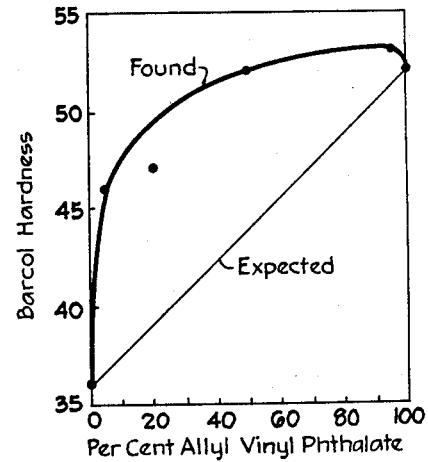
FIG. 2 Copolymer of Allyl Vinyl Phthalate and Diallyl Phthalate
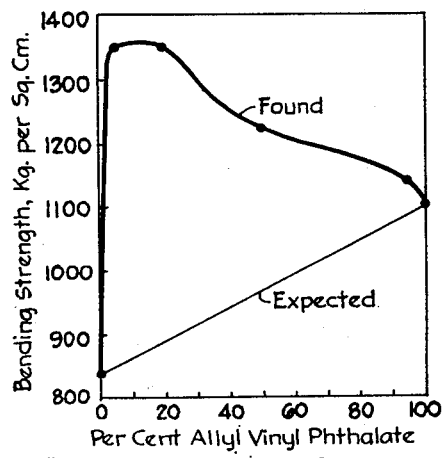
FIG. 3 Copolymer of Allyl Vinyl Phthalate and Diallyl Phthalate
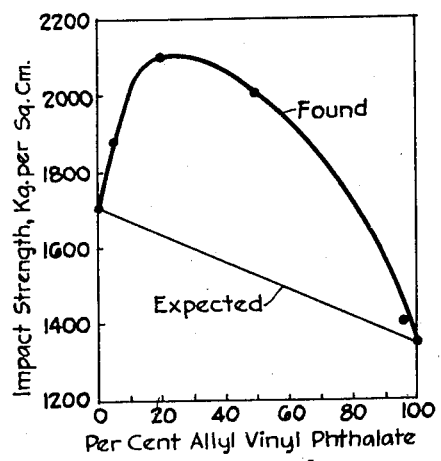
FIG. 4 Copolymer of Allyl Vinyl Phthalate and Diallyl Phthalate
Inventors: Theodore W. Evans
David E. Adelson
Lynwood N. Whitehill
By their Agent:

COPOLYMERS OF DIALLYL PHTHALATE WITH ALLYL VINYL PHTHALATE

Theodore W. Evans, Oakland, and David E. Adelson and Lynwood N. Whitehill, Berkeley, Calif., assignors to Shell Development Company, San Francisco, Calif., a corporation of Delaware Application October 14, 1946, Serial No. 703,190

5 Claims. (Cl. 260—78.5)

This invention relates to synthetic resins which are copolymers of diallyl phthalate with allyl vinyl phthalate.

Many copolymers have been prepared heretofore by subjecting a mixture of two different polymerizable unsaturated compounds to conditions under which additive copolymerization of the compounds occurs. The homopolymers of these compounds obtained by polymerizing a single compound have certain distinctive physical properties depending upon the particular compound which is homopolymerized. In order to obtain polymers with modified properties, a mixture of two different compounds are polymerized and a copolymer or interpolymer is formed wherein the two compounds are chemically combined. In other words, the copolymer contains distinct units joined by chemical bonds of each of the compounds and the copolymer is not merely a physical mixture of the homopolymer of each compound. The physical properties of these copolymers are dependent both upon the proportions of the two compounds contained in the copolymer and the properties of the homopolymers of the compounds. It would be expected that the numerical values for any property of a copolymer would bear a direct linear relationship which is a simple average of the numerical values of that property in the homopolymer of the respective compounds and the percentage of the compounds in the copolymers. Thus, in U. S. Patent No. 2,370,578 preparation of copolymers is suggested in a general way, and among many other polymerizable compounds, allyl vinyl maleate and diallyl phthalate are named. A series of copolymers containing different percentages of allyl vinyl maleate and diallyl phthalate were prepared along with the homopolymers of these compounds. Polymerization was continued until the substances thermoset to an infusible polymer by heating at about 65° C. for 144 hours in the presence of 2% benzoyl peroxide. The Barcol hardness of the copolymers and homopolymers was then determined.

In Fig. 1 of the accompanying drawing the values of the Barcol hardness is plotted against the percentage of allyl vinyl maleate contained in the polymer. The Barcol hardness is given on the vertical axis and the percentage of allyl vinyl maleate is shown on the horizontal axis. As was to be expected, an almost exact linear relationship exists which is an average of the percentage of the constituents in the polymer and the Barcol hardness of the respective homopolymers. This linear relationship is shown by the straight line drawn between the Barcol hardness of 36 for 0% allyl vinyl maleate (100% diallyl phthalate) and the hardness of 68 for 100% allyl vinyl maleate.

In view of the foregoing findings with respect to the copolymers of diallyl phthalate and allyl vinyl maleate, it was entirely unexpected to discover that copolymers of diallyl phthalate with allyl vinyl phthalate, which is chemically so closely related to allyl vinyl maleate, give copolymers which are decidedly harder than the expected linear relationship of hardness. In Fig. 2 of the accompanying drawing is shown a plot of hardness against percentage composition of the copolymer. The Barcol hardness is given on the vertical axis and on the horizonal axis is given the percentage of allyl vinyl phthalate contained in the polymer or copolymer with diallyl phthalate which were prepared, like the copolymers of diallyl phthalate and allyl vinyl maleate, by heating the constituents at about 65° C. for 144 hours in the presence of 2% benzoyl peroxide. The Barcol hardness values for the indicated compositions are shown with heavy dots. The Barcol hardness of homopolymeric diallyl phthalate (containing 0% allyl vinyl phthalate) was 36 while 100% allyl vinyl phthalate had a hardness of 52. The straight line of light weight (labeled "Expected") between these two points gives the expected linear relationship of hardness with changing composition. Contrary to this expectation, the heavy line (labeled "Found"), drawn through the points, indicates the relationship which was actually discovered. The copolymers from about 5% to 95% of allyl vinyl phthalate with diallyl phthalate have a hardness which is materially greater than the predictable linear relationship. For example, it would be expected that the copolymer from 5% allyl vinyl phthalate and 95% diallyl phthalate would have an increase in hardness measured on the Barcol scale of about 2.2% more than the hardness of homopolymeric diallyl phthalate, while actually an increase of about 28% is realized. In other words, the increase is more than twelve-fold that which was expected. Moreover, this greater hardness than the expected continues up to and including the copolymer from 95% allyl vinyl phthalate.

The hardness of synthetic resins is of great importance for their usefulness in many commercial applications, and in general, synthetic resins are not very hard. Their lack of hardness, such as is present in steel, stone and glass, make them subject to excessive wear and abrasion. Many synthetic resins are clear, transparent substances of glass-like appearance, but they do not have sufficient hardness for commercial use as glass substitutes. The light weight and toughness of transparent resins makes them particularly attractive as substitutes for glass windows in aircraft, for example. However because sand and other abrasive substances are thrown at high speed against the windows in such a use, it is of vital importance that the windows of synthetic resin be not of such softness as to be easily scratched and abraded. The resin must be as hard as possible while at the same time retaining toughness so as not to be subject to easy shattering from strains encountered in use.

Homopolymeric diallyl phthalate is a transparent resin having excellent toughness. While the polymer is considerably harder than many transparent synthetic resins, it is not as hard as could be desired and this is true even when the conditions used for polymerizing the diallyl phthalate are those most favorable toward producing hardness, i. e., by using comparatively low polymerization temperature over long periods of time. The superior hardness of the copolymer from a mixture of diallyl phthalate with about 5% to 95% allyl vinyl phthalate enables uses for the copolymer which are precluded by the properties of the homopolymer of diallyl phthalate. Moreover, this improvement in hardness is not obtained with a corresponding sacrifice in toughness as might be expected. In fact, the toughness is also improved and to an extent markedly greater than that predictable from linear relationships.

In Figs. 3 and 4 of the accompanying drawing are given plots showing the relationship in toughness with change in composition of the polymer. The polymers were prepared by polymerizing at about 65° C. for 144 hours in the presence of 2% benzoyl peroxide.

In Fig. 3 the bending strength is given on the vertical axis and the composition of the polymer on the horizontal axis. The bending strength is a measure of the toughness of a resinous material in being the flexural strength or modulus of rupture on bending. The bending strength was measured on a Dynstat testing machine. The values found for bending strength are shown as dots through which a heavy line has been drawn and labeled "Found." The expected linear relationship is indicated by the straight line of light weight labeled "Expected" drawn between the values at 0% and 100% allyl vinyl phthalate.

In Fig. 4 the impact strength is given on the vertical axis and the composition of the polymer on the horizontal axis. The impact strength is also indicative of the toughness of the resin in being a measure of the susceptibility to fracture by shock. The impact strength was likewise measured on a Dynstat testing machine. The values found for the impact strength for resins of the indicated compositions are shown by the dots through which a smooth line of heavy weight was drawn and labeled "Found." The expected linear relationship is indicated by the straight line of light weight drawn between the composition containing 0% and 100% allyl vinyl phthalate which line is labeled "Expected."

As shown in the drawing, the copolymer from diallyl phthalate and allyl vinyl phthalate has unexpectedly good hardness and toughness. This is especially true of the preferred copolymers from a mixture of about 5% to 50% allyl vinyl phthalate with diallyl phthalate.

The copolymers of the invention are prepared by polymerizing a monomeric mixture of allyl vinyl phthalate with diallyl phthalate using heat in the presence of a polymerization catalyst. The various peroxide catalysts are particularly suitable for this purpose such as benzoyl peroxide, acetyl peroxide, benzoyl acetyl peroxide, lauryl peroxide, succinyl peroxide, the tertiary alkyl peroxides and derivatives thereof like tertiary butyl perbenzoate, tertiary butyl hydroperoxide, and ditertiary butyl peroxide as well as other peroxy compounds such as peracetic acid, perphthalic acid and the like. If desired, other oxygen-yielding polymerization catalysts can be used such as the persalts like sodium or potassium persulfate, perborate or percarbonate. The amount of polymerization catalyst will ordinarily be between about 0.01% and about 5% although it is not necessarily limited to this range. Excellent results are obtained with about 2% to 4% polymerization catalyst.

The mixture of monomers containing the polymerization catalyst is heated to effect the copolymerization. Temperatures between about 60° C. and 180° C. are suitable, although higher or lower temperatures can be used. When the copolymers are prepared by cast polymerization excellent results are obtained by copolymerizing at temperatures of about 90° C. to 115° C.

In preparing the copolymers of the invention, polymerization from the monomeric state to the final thermoset infusible state can be effected in a single operation or, if desired, the polymerization can be interrupted before this stage is reached and then continued in a second operation. For example, lacquers of the copolymer can be prepared by polymerizing the monomer mixture in a solvent such as toluene, xylene, or acetone and interrupting the polymerization by cooling, for example, so that a solution of soluble polymer which also contains some unpolymerized monomers is obtained. Such a solution is useful as a coating composition wherein it is applied to a surface, the solvent permitted to evaporate therefrom, and the deposited polymer cured to the infusible state by baking. When the copolymer is desired for molding operations, it is useful to effect so-called pearl polymerization, i. e., polymerization in a dispersed state in water. In this case also, the monomers are only partially polymerized and minute spheres of polymer are obtained which are convenient for handling in molding operations.

For instance, a molded article was prepared from the copolymer containing about 10% allyl vinyl phthalate and 90% diallyl phthalate. About 1 part of a mixture of the monomers of this composition with about 4 parts of water containing 1% of polyvinyl alcohol as stabilizer and about 2% benzoyl peroxide was vigorously agitated so as to disperse the monomers into minute globules. Polymerization was effected by heating the reaction mixture at 85° C. for about 5¼ hours while continuing the vigorous agitation. The partly polymerized copolymer was obtained as a powder of minute spheres. About 40% of alpha floc and about 2% of tertiary butyl perbenzoate were incorporated with the pearls by milling and the composition introduced into a mold. The partly polymerized polymer and floc were cured in the mold to an infusible material by heating about 3 minutes at 150° C. under 2000 pounds per square inch. The molded copolymer had an excellent smooth surface and a Barcol hardness of 55.

The partially polymerized copolymer can exist as a viscous liquid or as a substantially solid material. The liquid is useful for preparing laminated articles of exceptional strength and hardness, wherein the copolymer is employed as a bonding agent for layers of textile fabrics, paper or glass cloth. For example, a laminate was prepared using Army duck as the fabric. Allyl vinyl phthalate was partially polymerized in the presence of 3% benzoyl peroxide at 65° C. by heating for 1½ hours. The partial polymer was a viscous material that had a refractive index (20/D) of about 0.0073 unit higher than the unpolymerized monomer. Diallyl phthalate was partially polymerized by flowing it through a heated glass tube in the presence of about 0.1% tertiary butyl hydroperoxide at 220° C., and at such a rate that the refractive index (20/D) rose about 0.0130 unit. A mixture was prepared containing about 20% of the allyl vinyl phthalate partial polymer and about 80% of the diallyl phthalate partial polymer. To this was added about 3% benzoyl peroxide as polymerization catalyst. A laminate was prepared using 8 plies of the Army duck by placing a platen in a bath of the partial polymer mixture and then successively stacking the fabric on the platen using care to work out any air bubbles. The other platen was then placed on the stack and the assembly lightly clamped together after which it was removed from the bath. The polymerization of the partial polymer to the infusible resin was effected by heating the assembly in an air oven, the laminate having a thermocouple therein to determine temperature. The heating schedule used was as follows:

| Time | Laminate temperature |
| --- | --- |
|  | °C. |
| 15 min | 25-75 |
| 45 min | 75-80 |
| 60 min | 80-85 |
| 30 min | 85 |
| 30 min | 85-100 |
| 30 min | 100-110 |
| 30 min | 110-115 |

The finished laminate was marked for its clean, uniform, glossy surface. It had a Barcol hardness of 50.

If desired, various fillers and other substances may be incorporated into the copolymer such as wood flour, sheets or cuttings of paper, cloth, canvas, asbestos in powdered or long or short fiber length including defiberated asbestos, powdered or flake mica, wood chips, short or long wool fibers, synthetic or natural continuous thread fibers, glass fibers in continuous filament or fabric (woven or felted) form, etc.

We claim as our invention:

1. A copolymer from a mixture of polymerizable compounds consisting of monomeric allyl vinyl phthalate and diallyl phthalate containing 5-50% of the former.

2. An infusible copolymer from a mixture of polymerizable compounds consisting of monomeric allyl vinyl phthalate and diallyl phthalate containing 5-50% of the former which is of excellent hardness and toughness.

3. A hard tough infusible copolymer from a mixture of polymerizable compounds consisting of allyl vinyl phthalate and diallyl phthalate containing 10% of the former.

4. A process for producing a hard tough copolymer which comprises heating a mixture of polymerizable compounds consisting of monomeric allyl vinyl phthalate and diallyl phthalate containing 5-50% of the former in the presence of 1-5% of a peroxide polymerization catalyst at 60 to 180° C. for a time sufficient to form the infusible copolymer.

5. A process for producing a hard tough copolymer which comprises heating a mixture of polymerizable compounds consisting of monomeric allyl vinyl phthalate and diallyl phthalate containing 5-50% of the former in the presence of 2% of added benzoyl peroxide at 65° C. for 144 hours.

THEODORE W. EVANS.
DAVID E. ADELSON.
LYNWOOD N. WHITEHILL.

REFERENCES CITED

The following references are of record in the file of this patent:

UNITED STATES PATENTS

| Number | Name | Date |
| --- | --- | --- |
| 2,403,112 | Muskat | July 2, 1945 |
| 2,433,616 | Marple et al. | Dec. 30, 1947 |